April 3, 1945     J. D. LANGDON     2,372,726

CHECK VALVE DEVICE

Filed Feb. 7, 1942

Inventor
Jesse D. Langdon

By Henry J. Lucke

Attorney

Patented Apr. 3, 1945

2,372,726

UNITED STATES PATENT OFFICE 2,372,726

CHECK VALVE DEVICE

Jesse D. Langdon, Downey, Calif.

Application February 7, 1942, Serial No. 429,933

5 Claims. (Cl. 137—69)

This invention relates to check valve or vacuum breaker devices.

More particularly the invention relates to check valve devices for the outlet of supply valves which simultaneously open a waterway therethrough and close an air vent.

This application is a continuation in part of U. S. Serial No. 428,601, filed January 28, 1942, entitled Check valve device which matured into Patent No. 2,347,199, on April 25, 1944, and Serial No. 414,051, filed October 8, 1941, and entitled Flexible check valves and vacuum breakers, which matured into Patent No. 2,328,382, on August 31, 1943. An object of the invention is to prevent back syphonage when sub-atmospheric pressure exists in the line by cutting off the water passage and opening up an air vent.

This feature is accomplished by constructing the valve casing with a perforated wall. Such perforated means provides the air vent means. Such air vent means is closed off during normal flow of water through the valve, but is arranged to automatically open up when normal flow ceases and in the event of sub-atmospheric pressure within the inlet thus breaking the syphon and preventing back syphonage.

The means used to close the air vent during normal flow of water through the valve and also close the communicating passageway during the existence of sub-atmospheric pressure is effected by an oblique partially moving diaphragm-like member disposed across said passageway.

Further features and objects of the invention will be more fully understood from the detail description and the accompanying drawing, in which Fig. 1 is a vertical cross-sectional view of one embodiment of my invention taken on line 1—1 of Fig. 2;

Figure 1:
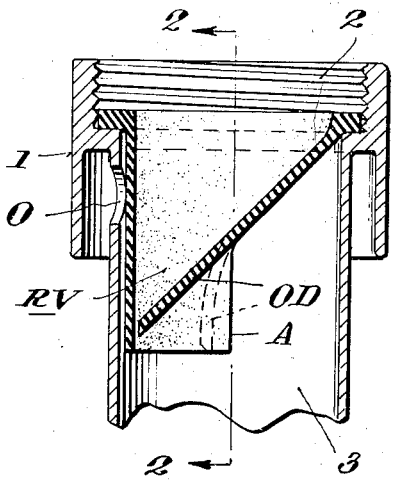
Figure 2:
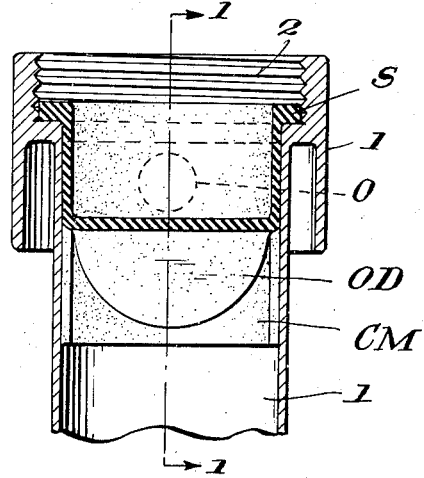
Fig. 2 is a cross-sectional view of the embodiment shown in Fig. 1 taken on the line 2—2.
Figure 3:
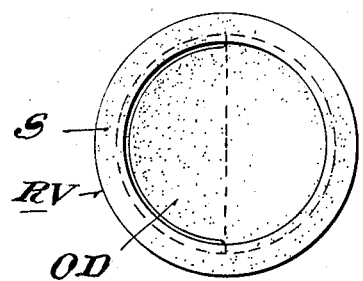
Fig. 3 is a bottom plan view of the embodiment shown in Fig. 1.

Referring to the drawing, the embodiment of the invention shown in Figs. 1 to 3 comprises a casing 1, having an inlet 2, an outlet 3 and one or more air vent openings O. A rubber valve RV is arranged to be inserted within said casing 1 and be retained in position by shoulder S.

An oblique diaphragm OD extending from and integral with shoulder S terminates in a substantially semi-circular configuration. Upon the normal flow of liquid from inlet 2 to outlet 3, the lower portion of diaphragm OD is bent backwards to a position shown by dotted lines in Fig. 1 to afford a passage for said liquid. As the water flows through the valve it is deflected against the apron A of the rubber valve RV by the diaphragm OD which in turn forces such apron A against the wall of the casing 1 surrounding the air vent opening or openings O to cut off said air vent.

In a position of rest, the check valve portion OD has its lower edge substantially conforming with the inner wall of the apron A and resting against the same, a semi-circular slit being formed between the inner circumference of the apron A and edge of the diaphragm OD.

During a period of rest, the rubber wall of valve RV resumes its vertical position spaced slightly away from casing 1 to form an air passage from the opening O to the interior of casing 1.

Figure 4:
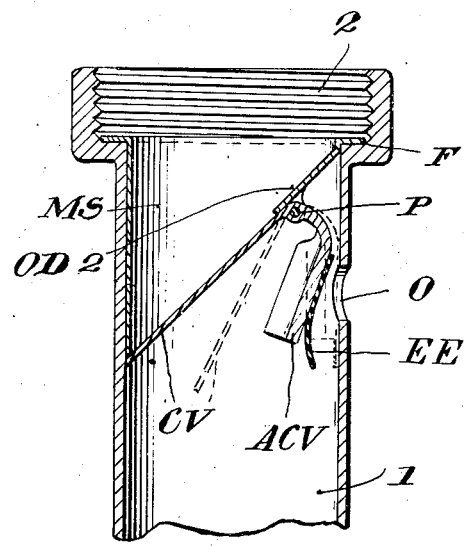
Fig. 4 is a vertical cross-sectional view of a modification of the embodiment of the invention shown in Figs. 1–3.

Another embodiment of the invention is shown in Fig. 4 and is provided with a flat flange F as a substitute for shoulder S of Figs. 1 to 3. Depending from said flange F is a metal sleeve MS and an oblique diaphragm OD2. Diaphragm OD2 is provided with a check valve portion CV formed integrally with air check valve ACV which registers with air vent opening O in casing 1. Air check valve ACV is provided with an elastic extension EE to more effectively seal the opening O against egress of the fluid flowing through the device.

As is illustrated in Fig. 4, during normal flow of liquid through the valve, check valve CV is forced downwardly to afford a passageway for the liquid and at the same time causes air check valve to tightly close opening O as shown by dotted lines in Fig. 4.

It will be observed from the embodiment illustrated in Figs. 1, 2 and 3, as well as in the embodiment illustrated in Fig. 4, that the upper portion of the obliquely extending diaphragm is fixed relative to the casing or tubular member 1, and that its lower portion is provided with suitable means for biasing the same toward its closing position, but displaceable under normal fluid flow. In both embodiments, the obliquely extending diaphragm cooperates to close the air vent openings in the tubular member 1. In the instance of the embodiment of Figs. 1, 2 and 3, the obliquely extending diaphragm serves to impede the flow of fluid and create a pressure within the fluid, causing the tubular body portion of the tubular valve member, in this instance of flexible material, to bulge outwardly and thus close the air vent opening O, and in the instance of the embodiment shown in Fig. 4, the obliquely downwardly extending diaphragm cooperates to close the air vent opening O by displacement of its lower displaceable portion, in conjunction with the air check valve ACV.

Upon cessation of the liquid flowing through the casing, check valve CV is forced upwardly impinging the end of metal sleeve MS and held in closed position by air check valve ACV forming a counter-weight.

From the above it is clear that back syphonage is precluded with embodiments of the instant invention for the instant normal flow of liquid ceases, the air vent is opened and the water passageway closed.

Whereas the invention has been described by reference to specific forms thereof, it will be understood that many changes and modifications may be made provided they do not depart from the scope of the claims.

I claim:

1. A check valve device comprising a casing providing a passageway and having an inlet and an outlet, air vent means disposed in the wall of said casing, sleeve means disposed within said casing adjacent said inlet, an oblique diaphragm extending across the passageway of said casing and flexibly attached to said sleeve means, a portion of said diaphragm forming check valve means arranged to close said passageway when sub-atmospheric pressure exists, said sleeve means constructed and arranged to close said air vent means during normal fluid flow whereby to serve as an air check valve with respect to said air vent means.

2. A check valve device comprising a casing providing a passageway and having an inlet and an outlet, air vent means disposed in the wall of said casing, flexible sleeve means disposed within said casing adjacent said inlet, an oblique diaphragm extending across the passageway of said casing and flexibly attached to said sleeve means, a portion of said diaphragm forming check valve means arranged to close said passageway when sub-atmospheric pressure exists, said flexible sleeve means arranged to close said air vent means during normal fluid flow whereby to serve as an air check valve with respect to said air vent means.

3. A check valve device comprising a tubular casing having an inlet and an outlet and an annular flange around the inlet, said tubular casing being further provided with air vent means disposed below said flange, an insert conforming to the inner surface of the casing and comprising a valved member having an elongated wall portion and projecting downwardly parallel to the casing wall to a point below the level of said air vent means and being provided with an annular flange engaging the flange of said tubular casing to support said valved member within said tubular casing, a portion of said insert being extended downwardly of the flange thereof to form an air vent closure, said valved member including a substantially downwardly and obliquely extending closure member having its upper portion relatively fixed and its lower portion swingably attached to the relatively fixed portion, said lower portion forming a valve member displaceable downwardly and laterally toward the side defined by the relatively fixed upper portion to open the valve, said insert having a funnel-like internal cavity defined by the wall portion of the valved member and said oblique closure portion when said valve member is closed, said wall portion and said oblique closure portion of said insert cooperating under the influence of internal fluid pressure in said cavity to create a lateral pressure within said insert to close said air vent means and to open said valve member to provide a passageway discharging downwardly to project a stream of fluid on a line parallel to said wall portion.

4. A device as of claim 3 wherein the insert is made of flexible material, the oblique closure member cooperating with the wall of the tubular insert under the influence of fluid pressure to urge said wall against the casing to close the air vent means.

5. A device as of claim 3 wherein the insert is made of rigid material and the displaceable valve member is hinged to the relatively fixed portion, the valve member being extended downwardly from the hinge for cooperation with the casing wall under the influence of fluid pressure to close the air vent means against the egress of fluid from the casing.

JESSE D. LANGDON.